United States Patent [19]

Silsby

[11] 3,720,795

[45] March 13, 1973

[54] MAGNETIC RECORDING SYSTEM FOR REPERTORY DIALER

[75] Inventor: John N. Silsby, Toms River, N.J.

[73] Assignee: Acron Corporation, Lakewood, N.J.

[22] Filed: April 13, 1971

[21] Appl. No.: 133,619

[52] U.S. Cl. ........................179/100.2 MD, 179/90 BB, 179/100.2 A

[51] Int. Cl. ..........................G11b 21/08, G11b 5/76

[58] Field of Search..179/90 BB, 100.2 A, 100.2 MD

[56] References Cited

UNITED STATES PATENTS

| | | | |
|---|---|---|---|
| 3,140,359 | 7/1964 | Rupard | 179/100.2 MD |
| 2,953,647 | 9/1960 | Johanson | 179/90 BB |
| 3,221,420 | 12/1965 | Heinberg | 179/100.2 MD |
| 3,267,484 | 8/1966 | Roedder | 179/100.2 A |

*Primary Examiner*—J. Russell Goudeau
*Attorney*—Robert M. Skolnik

[57] ABSTRACT

The specification describes a magnetic recording system for use in a repertory dialer. A frame is employed for supporting a rotatable cylinder having magnetic material affixed thereto. Support for the magnetic read/record head is provided by a rod and a notched rail, which slidably mounts a block formed of a plastic material. The block supports a first spring biased member which carries the magnetic head and a second pivotally mounted spring biased plate having a portion for engaging the notched rail. Depression of a rod against the bias of the spring on the plate causes a portion of the plate to disengage the notched rail thereby permitting the block to be slidably moved along the rod until a new position is established. The rod is disengaged from the plate and engagement of the entire assembly in the notched rail is then accomplished.

4 Claims, 6 Drawing Figures

INVENTOR
JOHN N. SILSBY
BY

INVENTOR
JOHN N. SILSBY

INVENTOR
JOHN N. SILSBY

MAGNETIC RECORDING SYSTEM FOR REPERTORY DIALER

This invention relates to magnetic recording devices and, more particularly, to a magnetic recording system having a manually moveable magnetic read-write head for use in a repertory dialer.

In a co-pending application filed of even date herewith having Ser. No. 133,620 in the name of Herbert I. Cohen, commonly assigned, there is disclosed an electronic circuit for a repertory dialer. The present recording system is designed for operation with that circuit.

A repertory dialer is a device which automatically dials one of a number of pre-recorded telephone numbers. Storage of the telephone number information has been accomplished in the prior art through different means. U.S. Pat. No. 3,419,759 shows one type of dialer apparatus employing a toothed card where the length of the teeth represent different digits of a telephone number. The prior art also teaches the use of a card having a magnetizeable portion where the desired telephone number is recorded. In general, however, it may be found that repertory dialers employ storage media of the magnetic tape, disc or drum types. The present invention provides an improved magnetic storage unit wherein a manually moveable head is positioned against the recording surface by a spring biased member affixed to a sliding block. The block is supported via both a rod member and notched channel. A pivotally mounted spring biased protrusion is affixed to said block to engage the notches of the supporting channel. Depression of a push button arrangement causes the protrusion to pivot out of the notch and freely slide to a new notch.

It is an object of the present invention to provide a simplified recording device for a repertory dialer.

Another object of the present invention is the provision of a magnetic recording drum having a manually indexable readwrite head.

These as well as further objects and advantages of the present invention will become apparent to those skilled in the art from a reading of the following specification reference being made to the accompanying drawings in which.

Figures 1, 4:
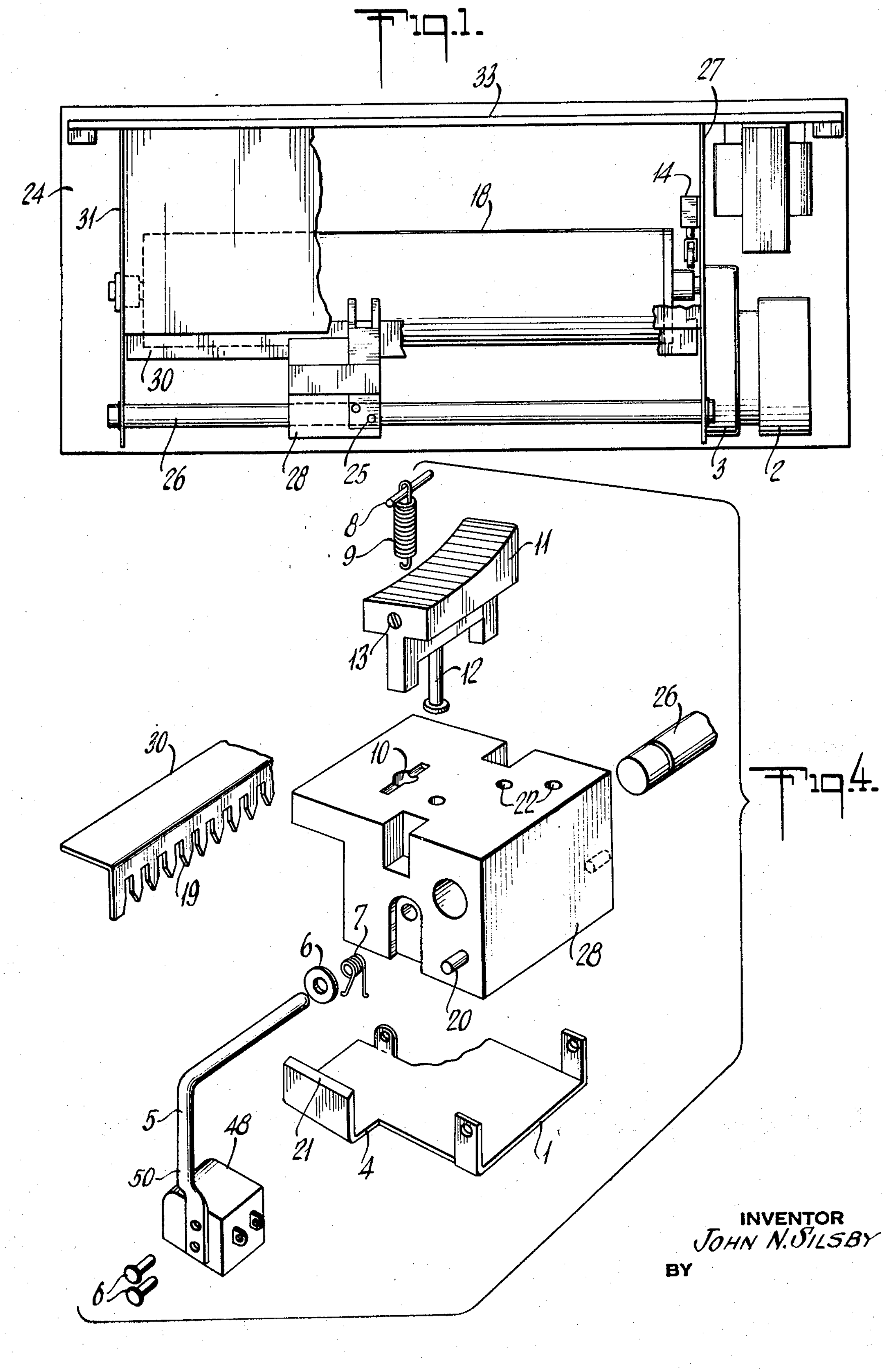
FIG. 1 is a top view of the invention.
FIG. 4 is an exploded view of the mechanical assembly of the recording cylinder frame.

In FIG. 1, numeral 2 denotes an electrical motor for rotating the magnetic recording media which may be a magnetic recording cylinder 18. Motor 2 is coupled to cylinder 18 through a gear train 3 in which each gear in the train rotates some whole number of times for each rotation of the cylinder 18. This arrangement effectively eliminates small discontinuities in speed of rotation of cylinder 18 that are caused by tooth to tooth error in the gear train. This elimination results from the fact that the information is read back with the same teeth in contact as when the information was recorded. Cylinder 18 is supported between end walls 27 and 31 via a shaft, not shown. A rod member 26 and a notched rail 30 are also mounted between walls 27 and 30 for supporting a slidably mounted Nylon block 28.

Printed circuit board 33 is mounted as shown between the two end walls.

Figures 2, 5A, 5B:
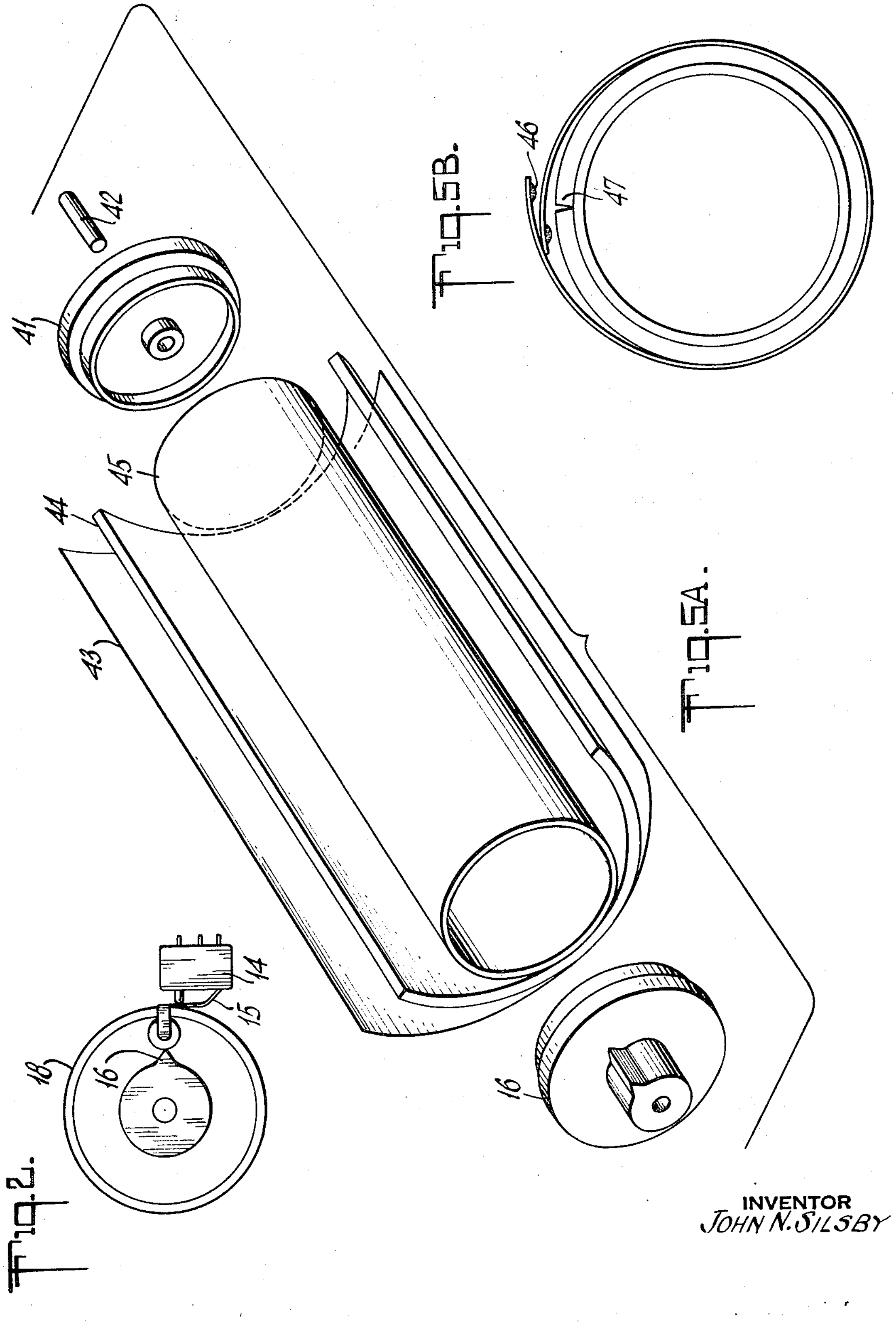
FIG. 2 is an end view of a portion of FIG. 1 taken along the lines 2—2 of FIG. 1.
FIGS. 5A–5B show the layered construction of the magnetic recording cylinder.
Figure 3:
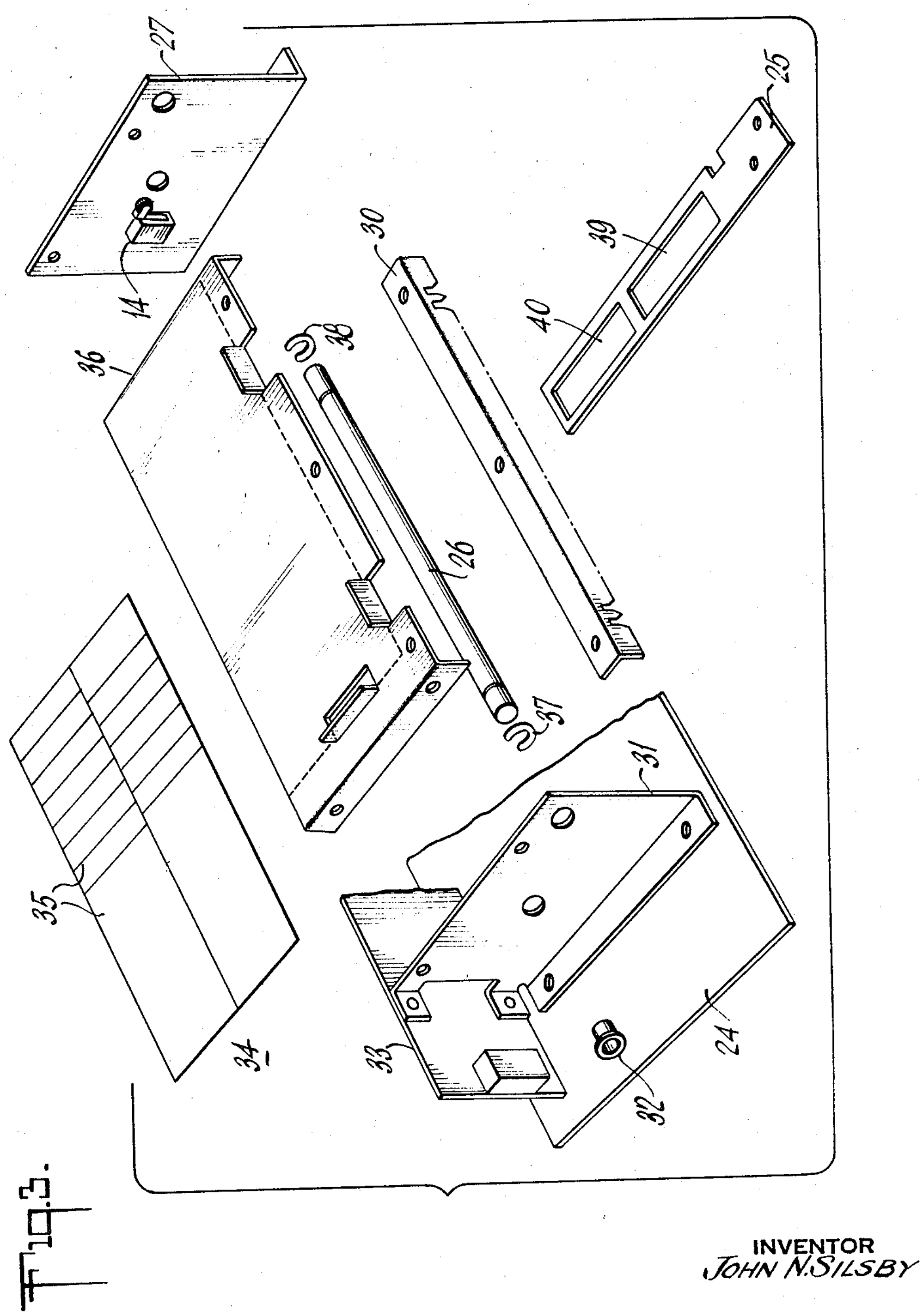
FIG. 3 is an exploded view of the head supporting block.

Referring now to FIGS. 2 and 3, micro switch 14 is affixed to side 27 and a roller on its actuating arm 15 contacts a cam lobe on the cylinder end cap 16 to provide a reference for the rotation of cylinder 18. The other end of cylinder 18 is affixed to supporting wall 31 via a bearing 32; also affixed between walls 27 and 31 is a guide rod 26, a notched guide rail 30 and a support plate 36. Rod 26 is secured in place by retaining rings 37 and 38 while rail 30 is rivited to plate 36 which is fastened by screws to end plates 27 and 31. Electrical connections are made from magnetic head 48, motor 2 and micro switch 14 to printed circuit board 33 which includes the electronic circuit of the aforementioned Cohen application. The entire assembly is mounted on base 24. Plate 36 provides support and locating means for card 34. This card has offset spaces corresponding to each indentation 19 in rail 30 to write the name of the person whose telephone number has been recorded on cylinder 18. Pointer arm 25 is affixed to block 28 with screws into threaded holes 22. The spaces 35 on card 34 will appear alternately in windows 39 and 40 of pointer 25 as slider 28 is moved.

FIG. 4 is a view of magnetic head block assembly 28. More particularly, block 28 has a hole there through to permit passage of rod 26 and an extended flat surface to rest on rail 30.

A magnetic read-write head 48 is supported by pivoted arm 50 spring biased by a torsion spring 7, hold in place in a recess in block 28 by washer 6. The spring biases the head into intimate contact with the magnetic surface of cylinder 18. Head 48 is attached to arm 50 with screws 6 and pivots in block 28.

Also shown is plate 1 having a protrusion 21 on one side thereof. Plate 1 pivots about pins 20 under pressure of plunger 12. An extension spring 9 retained in groove 10 of block 28 with pin 8 is attached to arm 1 at point 17 and serves to bias the member 1 against the action of plunger 12.

Protrusion 21, which has a knife edge, engages the notches 19 of rail 30. To move the magnetic head 48 plunger 11 is pressed moving protrusion 21 out of engagement with notch 19. This action also causes point 4 of arm 1 to contact point 5 of arm 50 and cause it to pivot head 48 away from cylinder 18. The block 28 is then slid to the desired new location. The plunger is released locking the assembly on the new position and returning head 48 to intimate contact with cylinder 18.

Plunger 12 is retained in knob 11 with set screw 13, 12 has a head formed on one end to prevent it from being withdrawn from 28 once it has been inserted from the bottom.

As shown in FIG. 5, the cylinder assembly 18 is composed of end caps 41 and 16, pin 42 and cylinder 45. The cylinder 45 is of a nonmagnetic material, i.e. aluminum or plastic. The cylinder is covered with a layer 44 of 2 lb/ft$^3$ polyurethane foam with an open celled structure. This is in turn covered with a mylar based magnetic film with the adhesive 46 applied as shown relative to the butt joint 47 of the foam gives a recording cylinder whose surface is totally useful for recording information.

I claim

1. A magnetic recording system comprising:

a base;

first and second support means mounted on said base; (a) rotable magnetic recording means axially mounted between said first and second support means, said recording means including cylindrical support means for supporting magnetic recording media thereon and a layer of soft foam between said recording media and said cylindrical support for providing a soft pliable magnetic recording surface; a notched support means mounted between said first and second support means in proximity to said recording means, said notches being formed between elongated spiked tipped separators; magnetic record-reproduce means slidably mounted on said notched support means, said record-reproduce means including a spring biased manually actuable portion having a knife edged portion for cooperatively engaging and disengaging said notches via said spiked separators enabling said record-reproduce means to be accurately positioned with respect to said rotatable recording means when said portion engages one of said notches, and pivotally mounted spring biased magnetic read-write head means connected to said manually actuable portion for pivoting into and out of engagement with said magnetic recording media upon actuation of said manually actuable portion.

2. The magnetic recording systems of claim 1 further including: a drive motor for said rotatable means, and gear means including a gear train where each gear in the train rotates a whole number of times connected between said motor and said recording means for driving said recording means for eliminating discontinuities in speed of rotation caused by tooth-to-tooth error in said gear train.

3. The system of claim 1 further including means to indicate when said rotatable means has completed a full rotation about said axis.

4. A magnetic recording system for a repertory dialer comprising: rotatable magnetic storage means having a pliable surface for storing information, slidably mounted magnetic record-reproduce support means mounted in proximity to said storage means, notched supporting means for said slidably mounted record-reproduce means, said notches being formed between elongated spiked separators, said slidably mounted record-reproduce means including pivotally mounted spring biased magnetic head supporting means;

spring biased flat U-shaped plate means mounted on said support means, said U-shaped means having an elongated knifed edged portion for engaging said notched support means via said spiked separators, manually actuable means for urging said U-shaped means against said spring bias into and out of engagement with said notched support means and said magnetic head into and out of engagement with said storage means.

* * * * *